US012542461B2

United States Patent
Imai et al.

(10) Patent No.: US 12,542,461 B2
(45) Date of Patent: Feb. 3, 2026

(54) TERMINAL BLOCK STRUCTURE FOR STATOR OF ELECTRIC MOTOR

(71) Applicant: TOYOTA JIDOSHA KABUSHIKI KAISHA, Toyota (JP)

(72) Inventors: Keita Imai, Seto (JP); Kiichi Yokoyama, Toyota (JP); Hiroki Monji, Toyota (JP); Yusuke Ueta, Shizuoka-ken (JP); Tatsuya Sakai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 182 days.

(21) Appl. No.: 18/481,612

(22) Filed: Oct. 5, 2023

(65) Prior Publication Data

US 2024/0223031 A1 Jul. 4, 2024

(30) Foreign Application Priority Data

Dec. 28, 2022 (JP) ................................ 2022-211911

(51) Int. Cl.
*H02K 1/18* (2006.01)

(52) U.S. Cl.
CPC ........... *H02K 1/18* (2013.01); *H02K 2203/06* (2013.01); *H02K 2203/09* (2013.01)

(58) Field of Classification Search
CPC ... H02K 1/18; H02K 2203/06; H02K 2203/09
USPC ....................................................... 310/71
See application file for complete search history.

(56) References Cited

U.S. PATENT DOCUMENTS

| | | | | |
|---|---|---|---|---|
| 7,288,866 B2* | 10/2007 | Kuribayashi | .......... | H02K 5/225 310/71 |
| 9,742,234 B2* | 8/2017 | Hashimoto | ............ | H02K 3/522 |
| 11,165,302 B2* | 11/2021 | Kitta | ........................ | H02K 5/10 |
| 2002/0043883 A1* | 4/2002 | Shimizu | ............... | H01R 13/405 310/71 |
| 2011/0115316 A1* | 5/2011 | Isogai | ................... | B60L 3/0061 903/906 |
| 2012/0306312 A1* | 12/2012 | Endo | ....................... | H02K 1/185 310/216.113 |
| 2012/0313460 A1* | 12/2012 | Schaflein | ............... | H02K 5/225 310/43 |
| 2014/0354094 A1 | 12/2014 | Yazaki et al. | | |
| 2017/0104281 A1* | 4/2017 | Kurono | ................... | H02K 3/522 |
| 2017/0110810 A1* | 4/2017 | Kurono | .................... | H02K 3/50 |
| 2020/0212752 A1* | 7/2020 | Kitta | .................. | H02K 11/0094 |
| 2022/0320937 A1 | 10/2022 | Takada et al. | | |
| 2024/0223031 A1* | 7/2024 | Imai | ........................ | H02K 3/50 |

FOREIGN PATENT DOCUMENTS

| | | |
|---|---|---|
| JP | 2003-319591 A | 11/2003 |
| JP | 2015-173596 A | 10/2015 |
| JP | 2022-108940 A | 7/2022 |
| WO | 2020/246408 A1 | 12/2020 |

\* cited by examiner

*Primary Examiner* — Rashad H Johnson
(74) *Attorney, Agent, or Firm* — SoraIP, Inc.

(57) ABSTRACT

An electric motor disclosed herein includes a stator core, a coil wound around the stator core, a terminal block, and a bus bar. The terminal block is disposed so as to face a side face of the stator core. The bus bar is connected to a lead wire of the coil, and is also fixed to the terminal block. The bus bar extends along the side face of the stator core in an axial direction of the stator core, and one end portion thereof is fixed to the terminal block by a bolt.

1 Claim, 2 Drawing Sheets

TERMINAL BLOCK STRUCTURE FOR STATOR OF ELECTRIC MOTOR

CROSS-REFERENCE TO RELATED APPLICATION

This application claims priority to Japanese Patent Application No. 2022-211911 filed on Dec. 28, 2022, incorporated herein by reference in its entirety.

BACKGROUND

1. Technical Field

The technology disclosed in the present specification relates to an electric motor.

2. Description of Related Art

Japanese Unexamined Patent Application Publication No. 2022-108940 (JP 2022-108940 A) discloses an example of an electric motor. In the electric motor according to JP 2022-108940 A, a bus bar is joined to a lead wire of a coil of a stator. The bus bar extends along an axial line from an end of the stator, in an axial line direction.

SUMMARY

In the electric motor according to JP 2022-108940 A, a middle of the bus bar is held by a bus bar holding portion attached to the end of the stator. The bus bar extends along the axial line of the stator in a direction away from the stator. An external connection terminal is provided at a distal end of the bus bar. The external connection terminal is further away from the stator than the bus bar holding portion. Accordingly, a portion of the bus bar beyond the bus bar holding portion readily vibrates. The present specification provides an electric motor with an improved arrangement of a bus bar connected to a lead wire of a coil.

The electric motor disclosed in the present specification includes a stator core, a coil wound on the stator core, a terminal block, and a bus bar.
The terminal block is disposed so as to face a side face of the stator core.
The bus bar is connected to a lead wire of the coil, and is also fixed to the terminal block. The bus bar extends along the side face of the stator core in an axial line direction of the stator core, and one end portion of the bus bar is fixed to the terminal block by a bolt. In the electric motor disclosed in the present specification, the bus bar follows the side face of the stator core, rather than being directed away from the stator core. Also, a distal end of the bus bar is fixed to the terminal block. According to this structure, the bus bar does not readily vibrate. Also, extending the bus bar being in a direction away from the stator increases length of the electric motor in the axial line direction. In the electric motor disclosed in the present specification, the bus bar is disposed along the stator core, and accordingly the length of the electric motor in the axial line direction is not increased.

In the electric motor disclosed in the present specification, two coils may be wound on a same tooth of the stator core, with the lead wires of the respective coils extending to an outward side of the stator core in a radial direction from an end of the stator core. In this case, another end portion of the bus bar is preferably branched into two, with the branches extending in the axial line direction of the stator core, and the lead wires being welded to the respective branches.

Details of the technology disclosed in the present specification and further improvements will be described in the "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
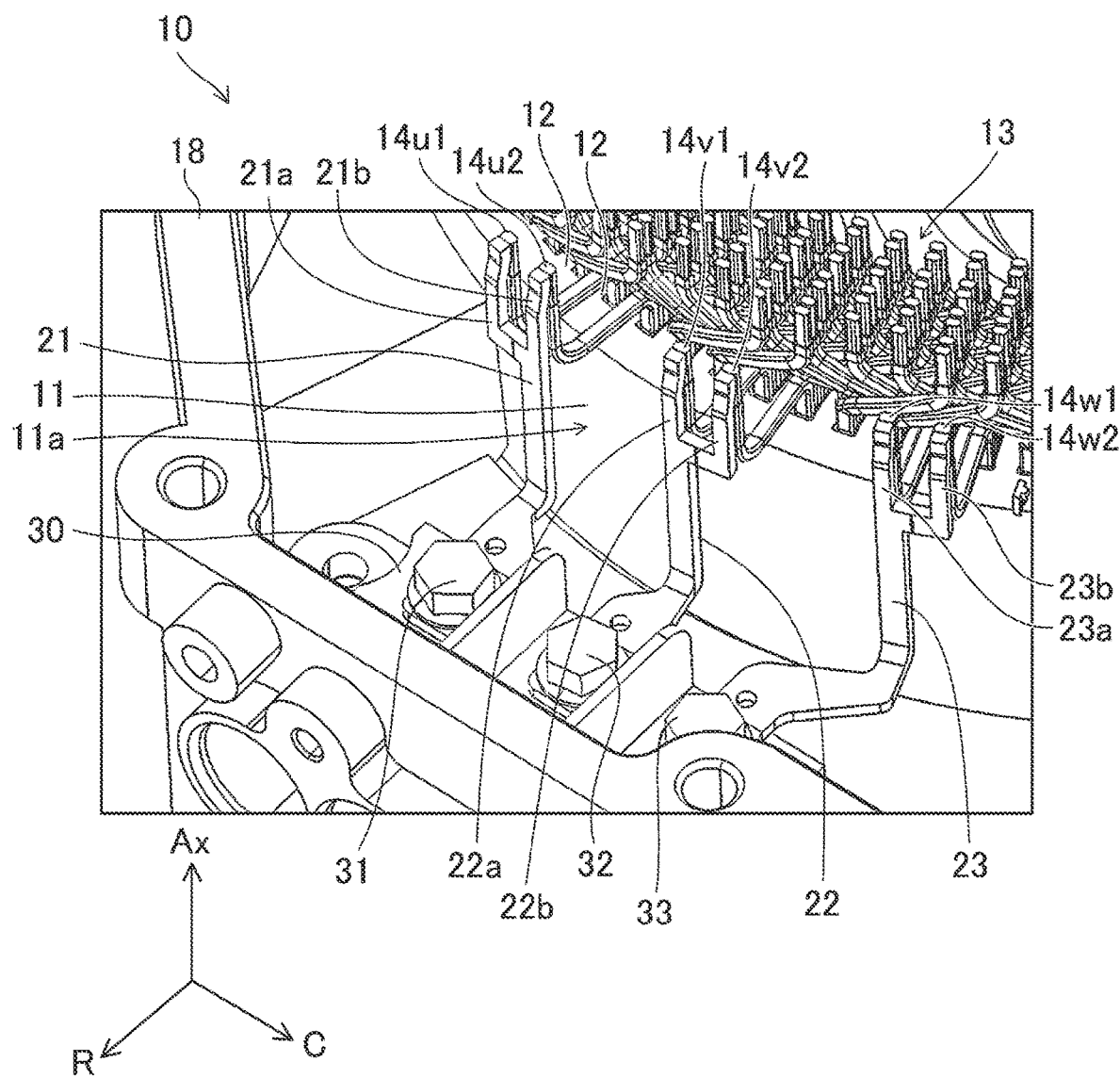
FIG. 1 is a partial perspective view of an electric motor according to an embodiment.
Figure 2:
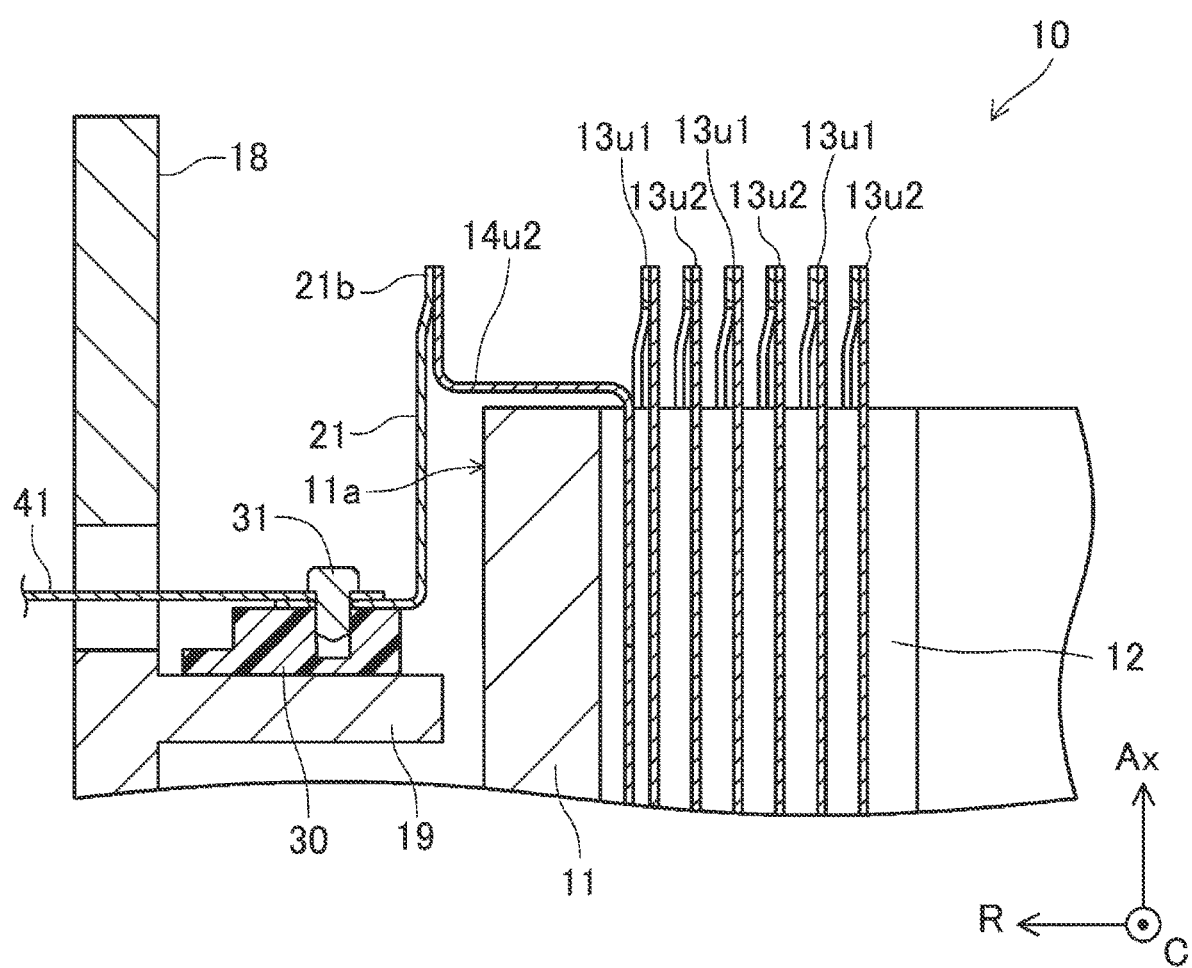
FIG. 2 is a cross-sectional view of an electric motor of an embodiment.

An example electric motor 10 is described with reference to the drawings. FIG. 1 is a partial perspective view of an electric motor 10. FIG. 2 is a cross-sectional view of the electric motor 10.

The electric motor 10 houses the stator core 11 and the rotor inside the housing 18. Note that the illustration of the rotor is omitted. As is well known, the stator core 11 is cylindrical. Ax axis of the coordinate system in the drawing is parallel to the axis of the cylindrical stator core 11. The R-axis corresponds to the radial direction of the cylindrical stator core. The C-axis corresponds to the tangential direction of the cylindrical surface of the stator core 11. The C-axis is perpendicular to each of Ax and R-axes.

A plurality of teeth 12 extend from the cylindrical inner surface toward the center of the stator core 11. A coil 13 is wound around each tooth. Two coils are wound around the same tooth. FIG. 2 illustrates a first coil 13$u$1 and a second coil 13$u$2 wound around the teeth 12. The first coil 13$u$1 and the second coil 13$u$2 are both U-phase coils, and current of the same phase flows in the same wave form. In other words, each phase of the three-phase alternating current includes two coils. By passing a current of the same phase in the same waveform to two coils wound on the same tooth, it is possible to reduce the current flowing per coil, it is possible to suppress the calorific value of the coil.

The coils of each of the three phases are star-connected. That is, one end of all the windings constituting the coil is coupled at one point. The other ends of all the windings constituting the coil are positioned at one end in the axial direction of the stator core 11 as lead wires of the coil. In FIG. 1, the lead wires 14$u$1, 14$u$2 of the two coils constituting the U-phase are located at the axial ends of the stator core 11. The lead wires 14$v$1, 14$v$2 of the two coils constituting the V-phase and the lead wires 14$w$1, 14$w$2 of the two coils constituting the W-phase are also located at one end of the stator core 11.

The lead wires 14$u$1, 14$u$2 of the two coils are welded to one end of the U-phase bus bar 21. The other end of the U-phase bus bar 21 is fixed to the terminal block 30 with a bolt 31. The terminal block 30 is fixed to a projection 19 protruding from the inner surface of the housing 18 toward the stator core 11. The U-phase bus bar 21 is L-shaped, extends from the terminal block 30 toward the side surface 11$a$ of the stator core 11, and bends at right angles to the axial direction (direction of Ax axial) in the vicinity of the side surface 11$a$.

The U-phase bus bar 21 extends along an axis (Ax axis) and extends along a side surface 11$a$ of the stator core 11. One end (end on the coil lead wire side) of the U-phase bus bar 21 is branched into two. The branch 21a is welded to the lead wire 14u1 of the U-phase first coiled 13u1. The branch 21b is welded to the lead wire 14u2 of the U-phase second coiled 13u2. As shown in FIG. 2, the lead wire 14u2 extends in the radial direction (R-axis direction) of the stator core 11 from the cylindrical inner side of the cylindrical stator core 11, and extends radially outward from the side surface 11a. By extending the lead wire 14u2 radially outward of the side surface 11a, the U-phase bus bar 21 is joined to the lead wire 14u2 without the U-phase bus bar 21 entering the inside of the side surface 11a of the stator core 11. The same applies to the other lead wire 14u1.

The V-phase bus bar 22 is similar and extends along the axis (Ax axis) and along the side surface 11a. One end of the V-phase bus bar 22 is also branched into two. The branch 22a is welded to the lead wire 14v1 of the V-phase first coil. The branch 22b is welded to the lead wire 14v2 of the V-phase second coil.

The W-phase bus bar 23 is similar, and extends along the axis (Ax axis) and along the side surface 11a. One end of the W-phase bus bar 23 is also branched into two. The branch 23a is welded to the lead wire 14w1 of the W-phase first coil. The branch 23b is welded to the lead wire 14w2 of the W-phase second coil.

The other end of the V-phase bus bar 22 is fixed to the terminal block 30 by a bolt 32. The other end of the W-phase bus bar 23 is fixed to the terminal block 30 by a bolt 33.

As shown in FIG. 2, the other end of the U-phase bus bar 21 is connected to the U-phase power bus bar 41 at the terminal block 30. The U-phase bus bar 21 is fastened together with the U-phase power bus bar 41 by a bolt 31. Although not shown, the other end of the V-phase bus bar 22 is connected to the V-phase power bus bar at the terminal block 30. The other end of the W-phase bus bar 23 is connected to the W-phase power bus bar at the terminal block 30. The U-phase/V phase/W phase power bus bar is connected to an inverter (not shown) and supplies a three-phase alternating current to the electric motor 10.

The advantages of the electric motor 10 will now be described. The U-phase bus bar 21 extends along the side surface 11a of the stator core 11. The ends (branches 21a, 21b) of the bifurcated U-phase bus bars 21 are joined to the respective lead wires 14u1, 14u2 of the two U-phase coils. The U-phase bus bar 21 is bent at right angles to the radial direction of the stator core 11 in the middle, and the other end is fixed to the terminal block 30. The terminal block 30 is disposed on the side of the stator core 11 and is fixed to the housing 18. The V-phase bus bar 22 and the W-phase bus bar 23 have the same structure as the U-phase bus bar 21.

One end of the U-phase bus bar 21 is joined to the lead wire of the coil, and the other end is fixed to the terminal block 30. With this configuration, the bus bar hardly vibrates. The bus bars 21, 22, and 23 are arranged along the side surface 11a of the stator core 11. With this configuration, it is possible to suppress an increase in the axial length of the electric motor 10. The same applies to the V-phase bus bar 22 and the W-phase bus bar 23.

As shown in FIG. 1, the cross section of the U-phase bus bar 21 is rectangular. Each of the branches 21a, 21b of the U-phase bus bar 21 has a rectangular cross section. The U-phase bus bar 21 having a rectangular cross section has high rigidity, and therefore, is difficult to vibrate. The same applies to the V-phase bus bar 22 and the W-phase bus bar 23.

One end of the U-phase bus bar 21 is joined to the lead wire 14u1, 14u2, and the other end is fixed to the terminal block 30. Both ends of the U-phase bus bar 21 are fixed, and no support is provided between the both ends. Therefore, the fixing structure of the U-phase bus bar 21 is simple. The same applies to the V-phase bus bar 22 and the W-phase bus bar 23.

Although the specific examples have been described in detail above, these are merely examples and do not limit the scope of claims. The techniques described in the claims include various modifications and alternations of the specific example illustrated above. The technical elements described in the present specification or the drawings exhibit technical usefulness alone or in various combinations, and are not limited to the combinations described in the claims at the time of filing. In addition, the techniques illustrated in the present specification or drawings can achieve a plurality of objectives at the same time, and achieving one of the objectives itself has technical usefulness.

What is claimed is:

1. An electric motor comprising:
    a stator core;
    a coil wound on the stator core;
    a terminal block that is disposed so as to face a side face of the stator core; and
    a bus bar that is connected to a lead wire of the coil, and is also fixed to the terminal block, wherein
    two coils are wound on a same tooth of the stator core, with the lead wires of the respective coils extending to an outward side of the stator core in a radial direction from an end of the stator core,
    the bus bar extends along the side face of the stator core in an axial line direction of the stator core, and one end portion of the bus bar is fixed to the terminal block by a bolt, and
    another end portion of the bus bar is branched into two, with the branches extending in the axial line direction, and the lead wires being joined to the respective branches.

* * * * *